United States Patent [19]

Klein

[11] Patent Number: 5,111,740

[45] Date of Patent: May 12, 1992

[54] ELECTRICAL APPARATUS USEFUL TO PREPARE A HOT BEVERAGE

[76] Inventor: Peter Klein, 19763-44th Avenue, Langley, British Columbia, Canada, V3A 3C9

[21] Appl. No.: 490,849

[22] Filed: Mar. 9, 1990

[51] Int. Cl.⁵ .......................... A47J 31/00; A23F 5/00
[52] U.S. Cl. .......................................... 99/295; 99/304
[58] Field of Search .................. 99/275, 279, 280, 283, 99/295, 299, 300, 302 R, 306, 316; 426/433

[56] References Cited

U.S. PATENT DOCUMENTS

| | | | |
|---|---|---|---|
| 2,968,560 | 1/1961 | Goros | 99/295 |
| 3,139,343 | 6/1964 | Baselt | 99/295 |
| 3,260,190 | 7/1966 | Levinson | 99/295 |
| 3,351,239 | 11/1967 | Flock | 222/67 |
| 3,423,209 | 1/1969 | Weber | 99/307 |
| 3,505,947 | 4/1970 | Bresaola | 99/307 |
| 3,719,505 | 3/1973 | Mazza | 99/275 |
| 4,143,589 | 3/1979 | Weber | 99/302 R |
| 4,253,385 | 3/1981 | Illy | 99/295 |
| 4,452,130 | 6/1984 | Klein | 99/307 |
| 4,487,114 | 12/1984 | Abdenour | 99/295 |
| 4,634,838 | 1/1987 | Berz | 99/307 |
| 4,662,271 | 5/1987 | Woltermann | 99/299 |
| 4,667,583 | 5/1987 | Tarozzi | 99/279 |
| 4,694,738 | 9/1987 | Tarozzi | 99/279 |
| 4,748,901 | 6/1988 | Burmeister | 99/295 |
| 4,784,051 | 11/1988 | Haüslein | 99/299 |
| 4,827,837 | 5/1989 | Johnson et al. | 99/280 |
| 4,944,217 | 7/1990 | Watanabe | 99/280 |

Primary Examiner—William A. Cuchlinski, Jr.
Assistant Examiner—John L. Beres

[57] ABSTRACT

An electrical apparatus useful to prepare a hot beverage from a flavor substance. The flavor substance is prepacked in single serve portions as filter units which include a filter carrier, a filter, a flavor substance and an upper closure. The apparatus has a storage tank for a liquid, a volumetric measurement tank, venting pipes that join the top corners of the volumetric measurement tank with the top section of the storage tank, a heater for the liquid and a shower head. A shut-off valve controls the flow of liquid between the storage tank and the volumetric measurement tank. The heater controls the flow of liquid from the volumetric measurement tank to the shower head. The apparatus allows the liquid to pass from the shower head through the upper closure of the filter unit so that liquid may pass through the flavor substance in the filter to form the beverage.

16 Claims, 9 Drawing Sheets

ELECTRICAL APPARATUS USEFUL TO PREPARE A HOT BEVERAGE

FIELD OF THE INVENTION

The invention relates to an electrically operated apparatus for the preparation of hot drinks. The apparatus comprises a liquid container, a volumetric measurement tank; a heating element with a pass through boiler, a shower head and a filter unit in which the substance from which the drink is to be made is located.

DESCRIPTION OF THE PRIOR ART

Such systems are well known in households as coffee machines and are of proven utility. Particular arrangements have been described to brew the drink by means of single serve pre-packed portions such as in U.S. Pat. No. 4,452,130, DE 3613119 C2, DE 3413654 AI, DE-AS 2200616. One common objective of the above mentioned disclosures is to increase convenience for the consumer. Further and more specific objectives are consistency of brewing results and improved aroma extraction from the flavour substance. Means to achieve this are sheltering the flavour substance from the oxygen in our atmosphere during storage, and good control of brewing parameters such as the temperature of the brewing water, the speed of water passing through an extraction system, and the relationship between the quantity of flavour substance, its grind index and brewing time. Another specific objective, as described in U.S. Pat. No. 4,452,130, is the safe use of such a system in mobile application such as in cars, where it is important to combine spill proof processing with simple handling. The system described in U.S. Pat. No. 4,452,130 is limited however, in that storing of any quantity of brewing water in excess of one cup must take place externally of the brewing apparatus.

In other disclosures that describe technical means to derive preselected portions from a larger quantity of stored liquid, such as DE-OS 2436715 and DE-OS 3436984 AI, it is evident that consistent volumetric portioning cannot be achieved if accelerations or tilting the apparatus out of its normal upright operating position occur. This is largely due to inconsistent amounts of air getting trapped in corners of volumetric measurement tanks.

SUMMARY OF THE INVENTION

It is the objective of this invention to describe a technical arrangement by measn of which it is possible to brew portions of hot beverages in moving vehicles, safely and conveniently, using single serve prepacked portions for the flavour substance, and the brewing apparatus providing storage capacity for more than one cup of brewing water.

Accordingly the invention is in an electrical apparatus useful to prepare a hot beverage from a flavour substance, the apparatus including a storage tank, a volumetric measurement tank, a flow-through heater, a shower head, a single serve filter unit comprising a filter carrier with filter and flavour substance and an upper closure for the filter carrier and is the improvement whereby the heater unit comprises: a storage container for a liquid with the volume of at least one cup of finished brew; a volumetric measurement tank holding the volume of just one cup of finished brew; a shut off valve between the exit of the storage container and the entrance into the volumetric measurement tank; venting pipes joining the inside top corners of the volumetric measurement tank with the inside top section of the storage tank; a heater for the liquid; a shower head adapted to be in alignment with the filter unit; a first pipe communicating the shower head with the heater and at least one second pipe protruding from the shower head, whereby movement of shower head and filter unit against each other causes the second pipe to pierce the upper closure, allowing the liquid to pass through the head into the filter.

DESCRIPTION OF THE PREFERRED EMBODIMENT

Figure 1:
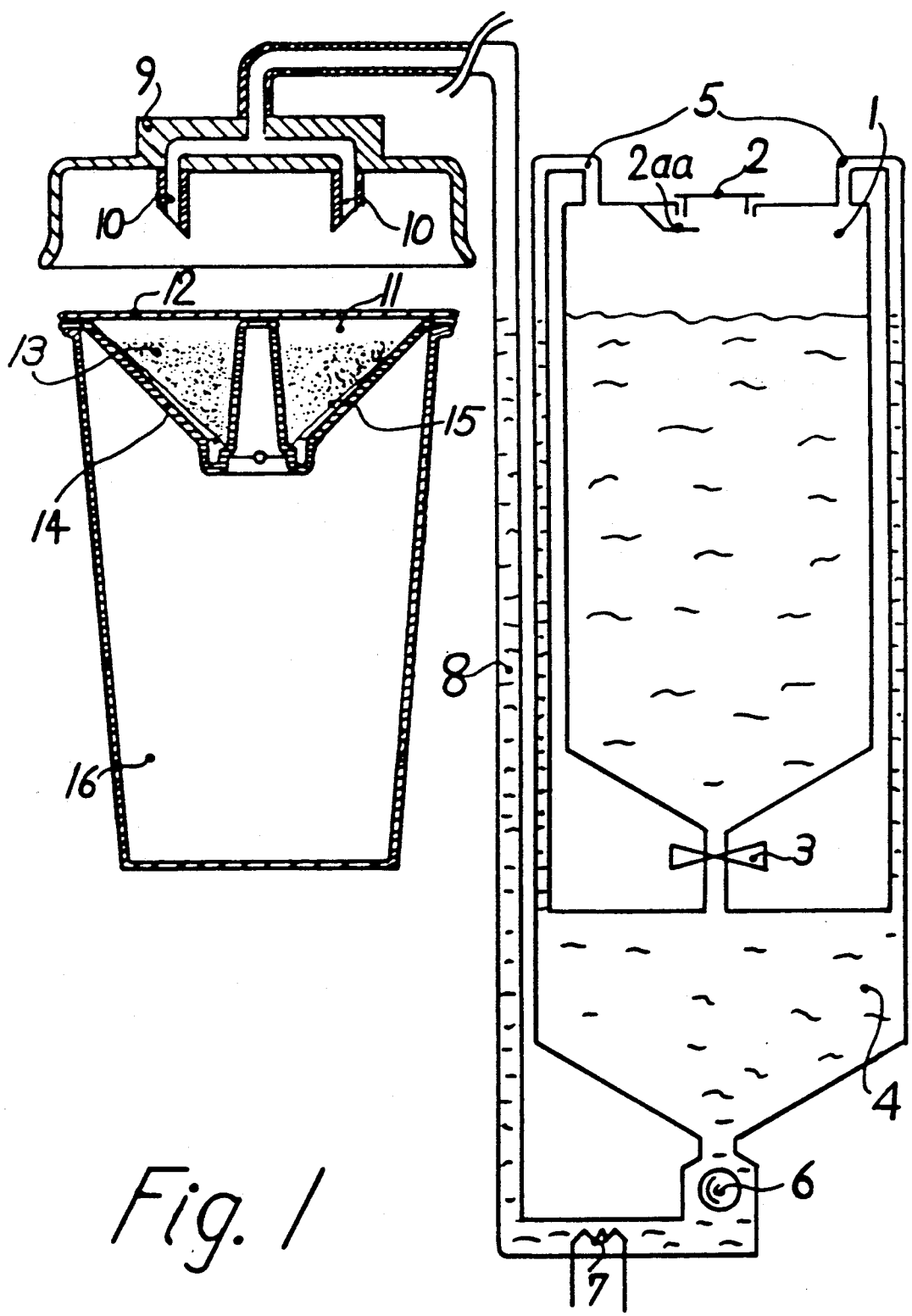
FIG. 1 shows a cross section of the apparatus whereby a cup serves as support for the filter unit.

As outlined in FIG. 1, the liquid from which the brew is to be made is stored in storage tank 1. The storage capacity of tank 1 provides for at least one portion of finished brew, but will typically hold liquid for a higher number of portions. Lid 2 closes the opening that is used to fill up tank 1. Valve 3 can be actuated in a suitable manner to allow the transfer of liquid from tank 1 into the volumetric measurement tank 4. To meet the objective of completely filling tank 4 under all inclination angles normally experienced by motor vehicles, venting pipes 5 provide an escape route for any air trapped in the upper corners of tank 4 during filling and they maintain atmospheric pressure above the liquid in tank 4 when liquid exits from tank 4 to be heated. To prevent liquid from escaping through venting pipes 5 to the environment outside of the apparatus, venting pipes 5 are run into the top section of tank 1. Check valve 6, Heater 7, and first pipe 8 are designated to deliver the heated liquid to shower head 9, which is equipped with second pipes 10 in order to distribute the hot liquid over the flavour substance 13. Flavour substance 13 is located in filter unit 11 as described in U.S. Pat. No. 4,452,130 or CD1172211. Filter unit 11 is adapted to fit into the top section of the cup 16, as described in U.S. Pat. No. 4,452,130 or CD1172211, so that when this arrangement is brought against head 9 second pipes 10 pierce the upper closure foil 12. Hot brewing liquid may then pass through flavour substance 13, through filter 15 and exit as brew at the bottom of filter carrier 14.

Figure 2:
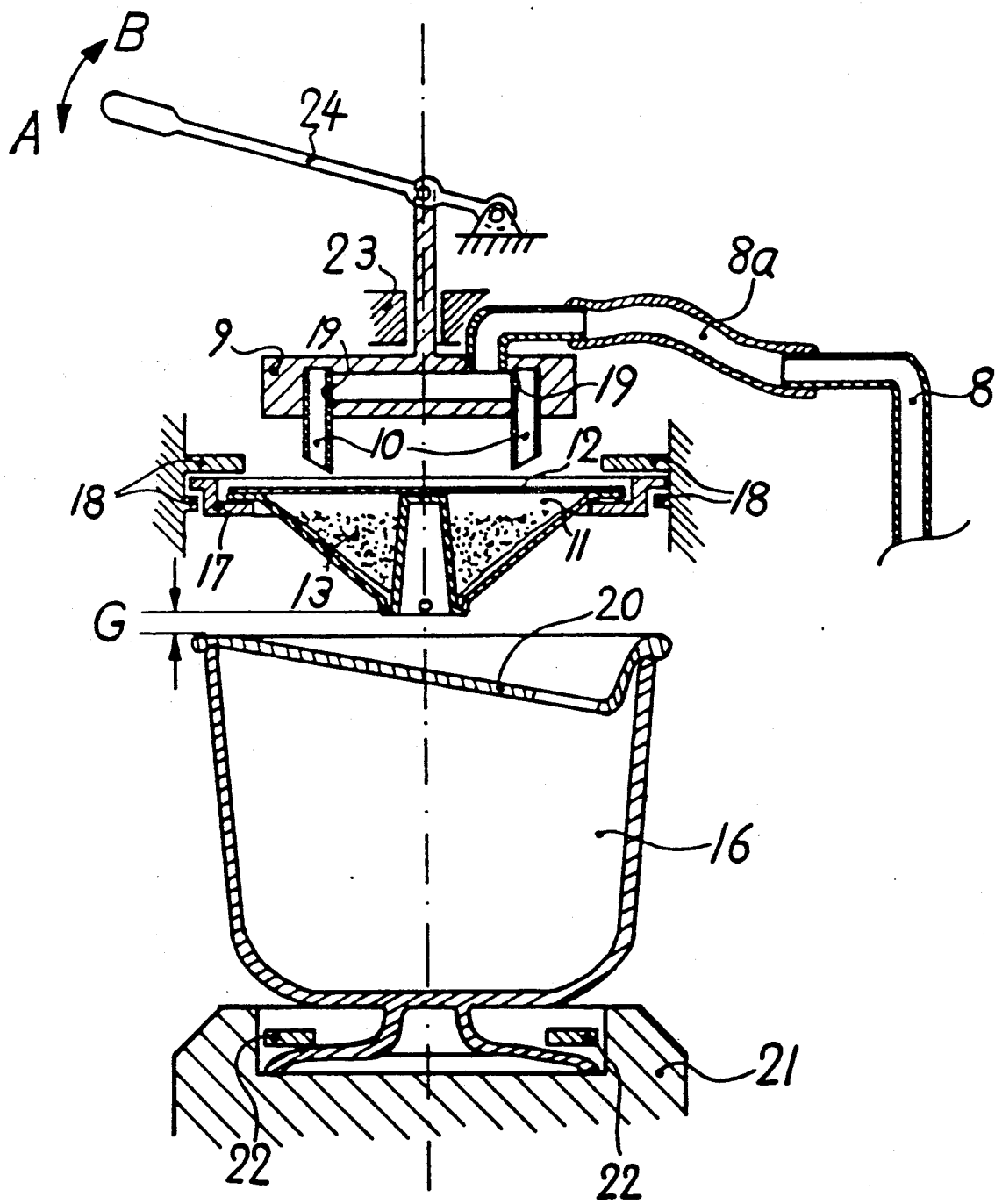
FIG. 2 shows a cross section of the apparatus with individual supports for the filter unit and a cup, and an embodiment for moving the shower head to and from the filter unit.

An alternative arrangement regarding shower head, filter unit cup is illustrated in FIG. 2. The objective is to be able to install and remove the filter unit and the cup independently from each other. Support 17 is adaped to accept filter unit 11 and can be moved, guided by rails 18, in and out of the apparatus. Support 21 is adapted to accept a cup. This is achieved by the raised borders of the cup support and tongues 22 which press down onto the extended foot of the cup. Now a gap G exists between cup and filter unit, so that cup 16 and filter unit 11 can be installed and removed independently from each other. In moving vehicles it is advisable to use cup 16 with a lid 20 that is slanted and has an opening at its lowest point. Those cups are commercially available and are popularly named "commuter cups". They are specially designed to be used in moving vehicles, preventing spillage by the above mentioned lid and they are equipped with an extended foot which is formed such that the cups snap easily into a corresponding holder. Particulars regarding this type of cup are disclosed in U.S. Pat. No. Des. 279,850. Movement of the lever 24 in direction A casues head 9 to move down, so as to pierce closure foil 12 with second pipes 10, and movement of lever 24 in direction B causes head 9 to disengage from the filter unit 11 accordingly. First pipe 8 is equipped with a flexible section 8a to accommodate any relative movement between head 9 and heater 7. Vertical alignment of head 9, filter unit 11 and cup 15 is achieved through a fixed geometrical relationship of the positions for the head guide 23, the filter unit guides 18 and the cup support 21; a common chassis can provide this fixed relationship in conjunction with positional end stops for the slide 17 and the cup 16.

If head 9 is equipped with more than one second pipe 10 to achieve better distribution of hot brewing liquid over the flavour substance 13, then the openings 19 in second pipes 10 are reduced in diameter compared to the diameter of first pipe 8 in order to assist an even distribution of liquid flow among all second pipes 10.

The procedure to prepare a hot drink is as follows: The liquid from which the drink is to be brewed is filled into tank 1. Preferably valve 3 is open at this time so that when filling is complete tank 4 is completely filled and tank 1 is almost filled. It is necessary to leave enough air space at the top to allow air to flow from the outside through a small vent hole in the tank's top, which can e.g. be accomplished by a loose fit of lid 2, into one or more of venting pipes 5 and into tank 4. Furthermore, the relationship between the maximum filling level in tank 1 and the highest point of the venting pipes 5 must be such that under normal inclination and expected accelerations to which the apparatus is subjected liquid does not flow from tank through venting pipes 5 into tank 4. A mark at a suitable position may make the user aware of the optimum filing height. This mark can for example be a tongue (2a in FIG. 1) that protrudes from the tank top towards the inside of the tank and is visible through the opening that becomes closed off by lid 2. If the apparatus is built according to FIG. 1 a cup 16 with filter unit 11 is brought against the head 9 so that second pipes 10 piece closure foil 12. If the apparatus is built according to FIG. 2 the filter unit 11 and the cup 16 are placed onto their respective supports 17 and 21 and so become aligned with head 9. While lever 24 previously rested in position B lever 24 may now be moved towards position A until second pipes 10 have fully pierced through closure foil 12. Now shutting off valve 3 will prevent further flow of liquid from tank to tank 4.

By means of heater 7 and check valve 6 the liquid contained in tank 4, which represents one portion of the drink, is transferred in known manner to shower head 9, flows then through second pipes 10, is distributed over the flavour substance 13, filtered, and finally drips into cup 16.

When brewing is finished the entire liquid from tank 4 has been transferred into cup 16. Lever 24 may now be repositioned to B and the used filter unit 11 can be discarded.

To prepare subsequent portions of the drink, only valve 3 needs to be opened again until tank 4 has been refilled from tank 1 and the procedure as described above may be repeated.

Therefore, it can be seen that the phase prior to brewing is characterized by vavle 3 being open, the heater being shut off and the head being disengagd from the filter unit. And the brewing phase is characterized by valve 3 being closed, the heater being switched on and the head being engaged with the filter unit. Now it becomes obvious to provide a linkage, mechanical or electrical or otherwise, between lever 24, the shut off valve 3 and an electrical switch for the heater 7.

Figure 3:
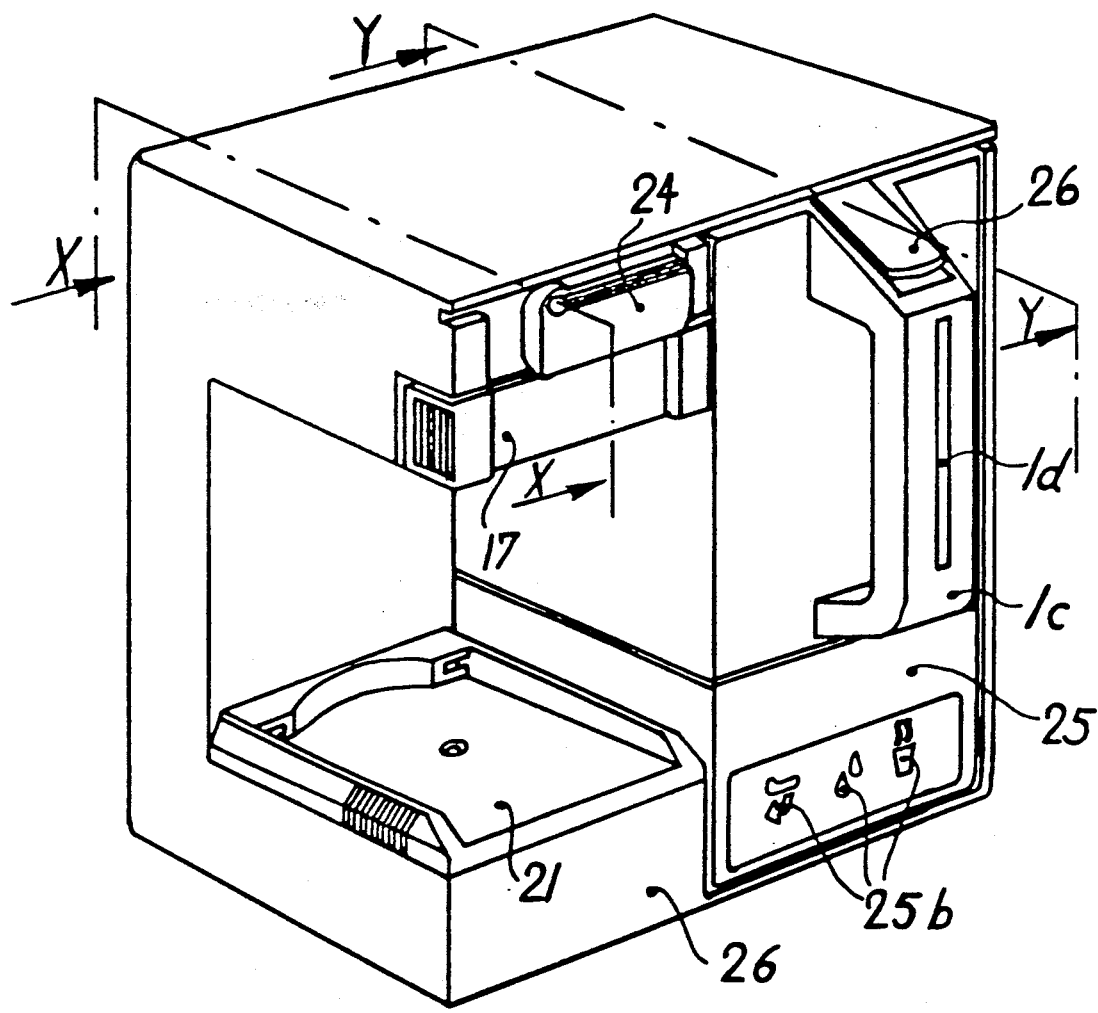
FIG. 3 shows in a perspective view a preferred embodiment which is sectioned in a chassis module and in a tank module with the tank module being removable from the chassis module.
Figure 4:
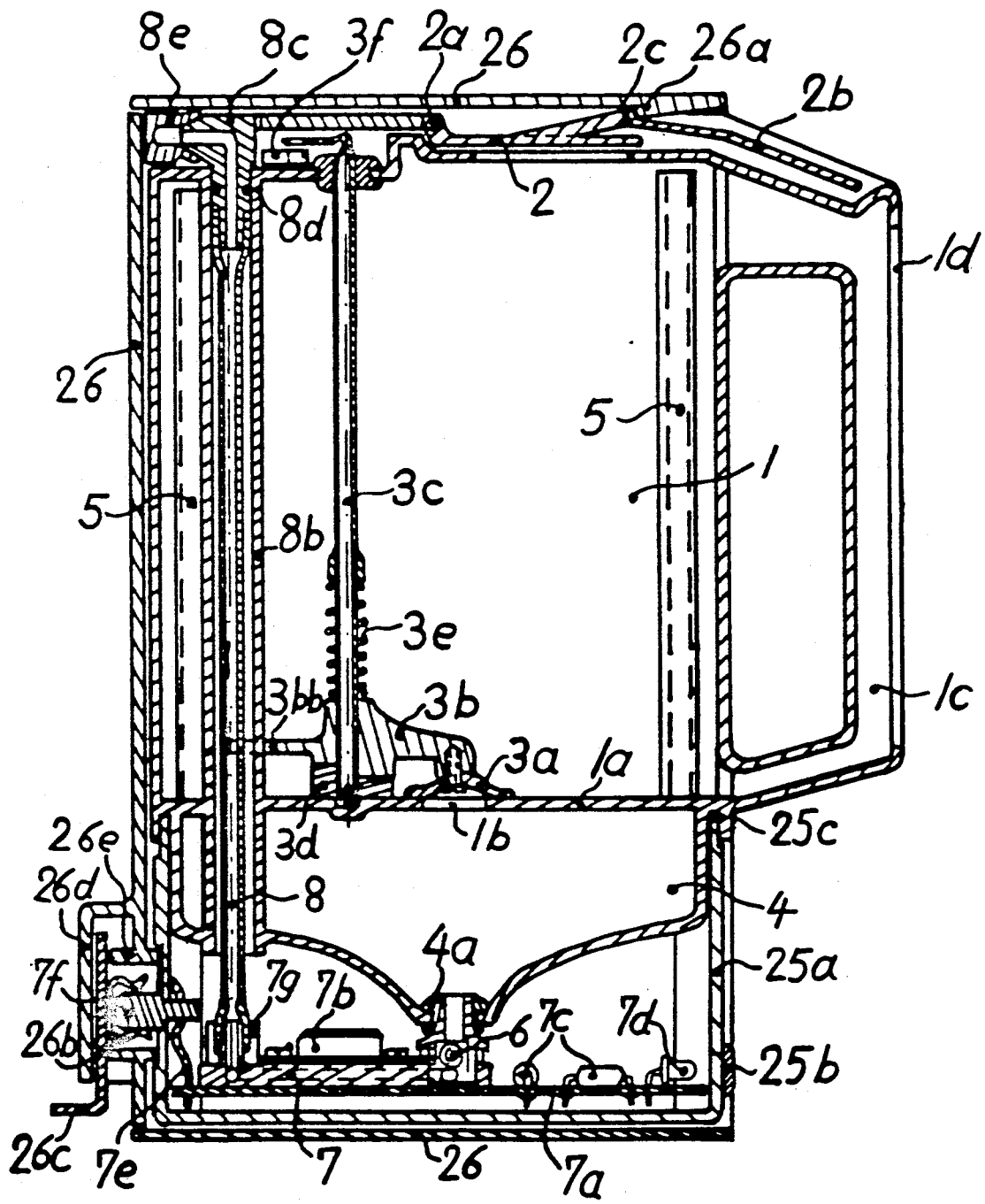
FIG. 4 shows a cross section Y—Y of the tank module.

What has been described so far covers the principles of the invention and in the following paragraphs a preferred embodiment is described in more detail. FIG. 3 shows the perspective view of an apparatus with a tank module 25 and a chassis module 26. Tank module 25 is equipped with handle 1c and can be removed from the chassis module 26 by pressing down onto latch lever 2b and pulling straight back on handle 1c. Optical indicators 25b signal the current process status to the operator. A see through section 1d at the front of handle 1c indicates the level of brewing liquid within the storage tank. The chassis module 26 provides for the cup support 21 and the filter support 17. By means of control lever 24 the support for the filter unit 17 may be unlatched and the brewing process started and stopped. Cross section Y—Y is illustrated in FIG. 4 and shows details of the tank module 25.

Figure 8:
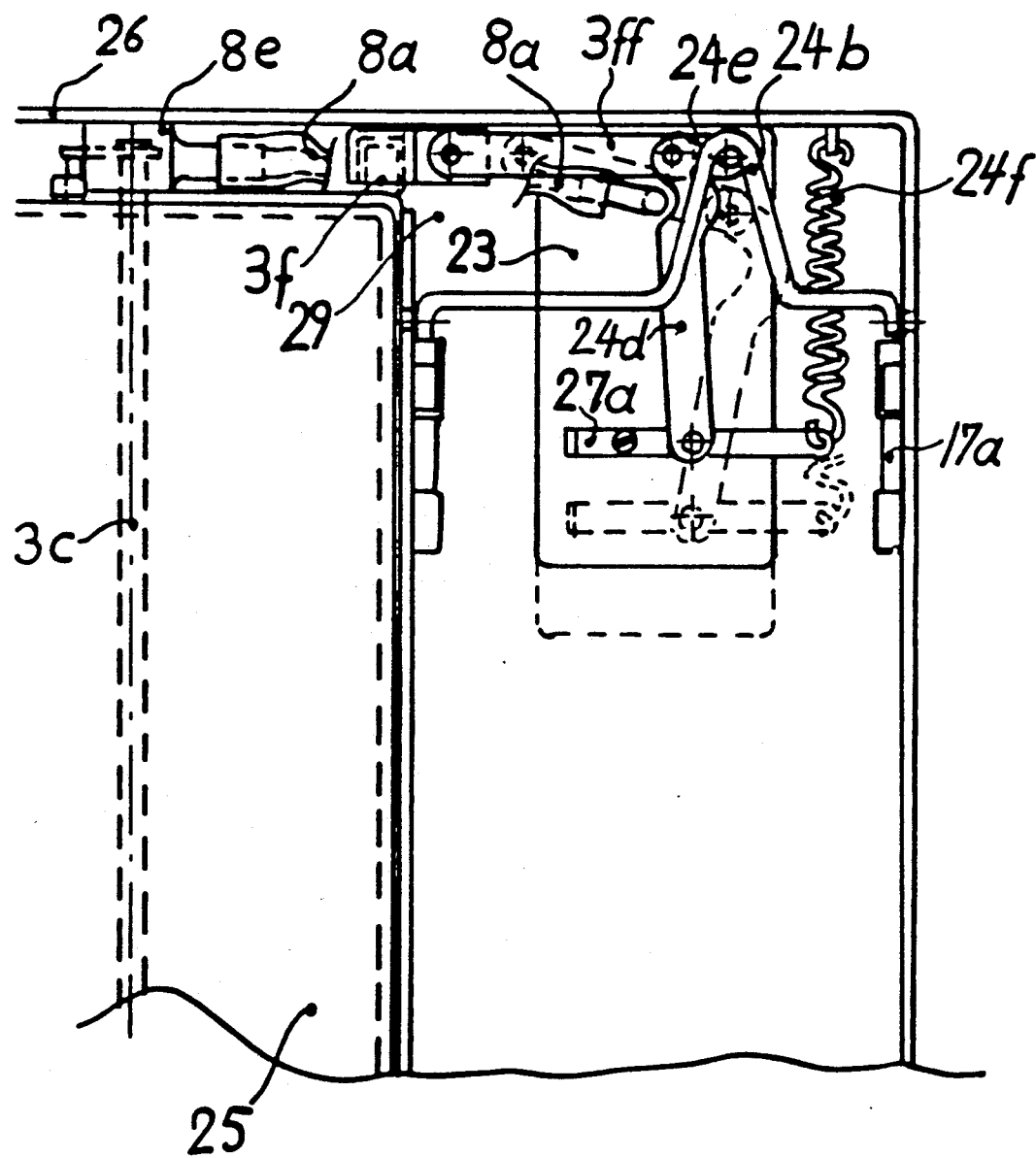
FIG. 8 shows a partial rear view of the embodiment with the rear wall removed.

Storage tank 1 and volumetric measurement tank 4 are separated from each other by wall 1a. The liquid from which the brew is to be made may flow from storage tank 1 through opening 1b into volumetric measurement tank 4, provided opening 1b is not covered by valve disk 3a. Valve disk 3a preferably is of flexible gasket material, and is attached to arm 3b. Arm 3b has a circularly slanted bottom adapted to fit the top shape of turning disk 3d, and has a rearward fork-like protrusion 3bb which interacts with fixed protective channel 8b, so that arm 3b is prevented from turning around the axis of shaft 3c. Arm 3b can slide in axial direction on shaft 3c and is pushed towards wall 1a by means of spring 3e. Turning disk 3d is mechanically coupled with shaft 3c so as to follow the rotational movement of shaft 3c. The rotational movement of turning disk 3d against non-rotational arm 3b in conjunction with the circularly slanted adjacent surfaces between turning disk 3d and arm 3b causes arm 3b to slide up when shaft 3c is turned clockwise (viewed from top) and causes arm 3b to slide down when shaft 3c is turned counter clockwise. Consequently valve disk 3a opens and closes opening 1b. The rotational movement of shaft 3c is introduced by connecting rod 3f which is actuated by control lever 24 via crank 24e and connecting rod arrangement 3ff (FIG. 3, FIG. 4, FIG. 8). Air is displaced from the volumetric measurement tank 4 into the top section of tank 1 by means of venting pipes 5, of which one is positioned in each corner to guarantee complete filling of tank 4 under all operating angles. Carrying handle 1c is equipped with a see through section 1d to monitor the liquid level in tank 1. The connection between heater 7 and tank 4 is separable and made water tight by a grommet type gasket 4a. Check valve 6 prevents liquid to flow back into tank 4. A first part of first pipe 8 extends from the heater 7 to the hot water connector 8c and is guarded by protective tube 8b, leaving some air space between the first part of first pipe 8 and protective tube 8b, so as to prevent significant heat loss to the cold liquid in tanks 1 and 4. Connector 8c forms the male part of a hot water connector for first pipe 8, whereby seal 8d prevents penetration of particles or liquid into the space between the first part of first pipe 8 and protective tube 8b. The female part 8e of the hot water connector for first pipe 8 is attached to the chassis 26 and first pipe 8 continues from here as second part of first pipe 8 to the shower head. Lid 2 is equipped with a hinge 2a and latch lever 2b. Latch lever 2b is equipped with a recession 2c which interacts with a protrusion 26a of the chassis module in order to retain the tank module within the chassis. Latch lever 2b preferably is of spring type material and exercises moderate pressure against the top of chassis 26 when the tank module is inserted into the chassis module as shown in FIG. 4, so as to keep lid 2 closed and to prevent the tank module from slipping voluntarily out of the chassis module. To remove the tank module from the chassis module it is necessary to press down latch lever 2b to unlatch and to pull back on the carrying handle 1c.

Heater 7 is mounted on a printed circuit board 7a which also carries electronic components 7c for the control circuitry of the heating elements 7b and lamp indicators 7d. Rigid contact strips 7e, three of which are in line in viewing direction in FIG. 4, are equipped with a threaded hole into which male contacts 7f are screwed from the outside of bottom cover 25a. Female contacts 26b are mounted onto contact plates 26c, providing connection to the electrical power source. Hood 26d provides support when contacts 7f and 26b are getting closed, yet there is enough clearance between the contacts 26b and contact plate 26c on one side and hood 26d and chassis opening 26e on the other side in order to allow some floating for contact plates 26c and contacts 26b which serves to prevent bending of contacts 26b if perfect alignment between contacts 7f and 26b does not exist. Seal 25c between bottom cover 25a and tank housings 4 and 1 prevents intrusion of liquid and contamination of the electric circuitry. To disperse the light of indicator lamp 7d a window pane 25b with suitable optical properties is attached to bottom cover 25a in front of indicator lamp 7d.

Figure 5:
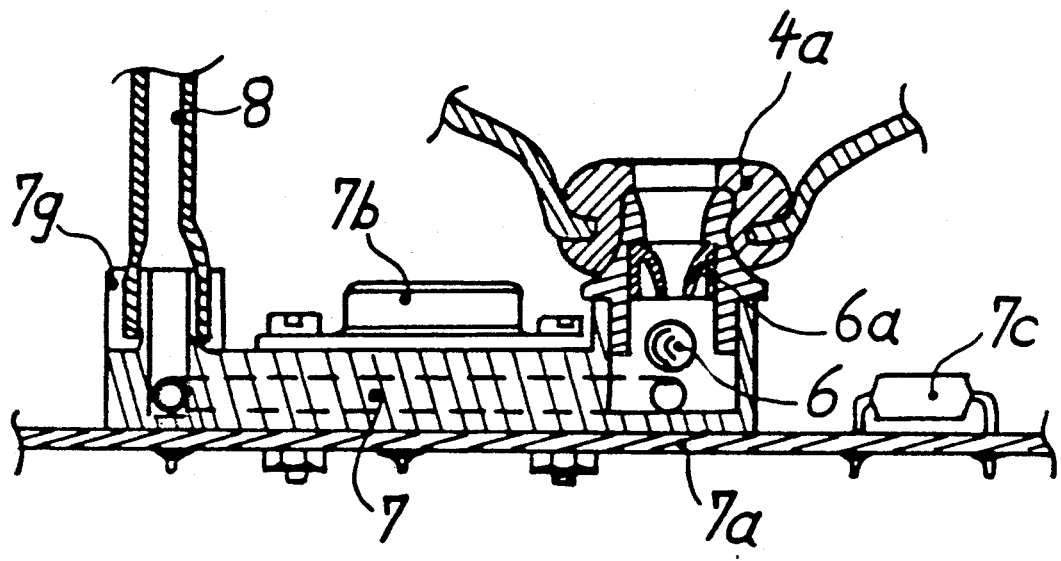
FIG. 5 shows a cross section of the heater.
Figure 6:
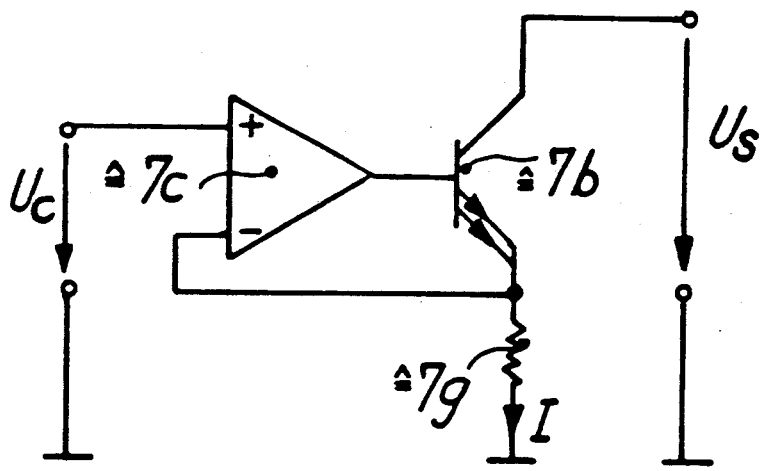
FIG. 6 shows a schematic of the control circuit for the heating elements.

FIG. 5 illustrates the heater 7 in more detail. The seat 6a for check ball 6 is located in the inlet into heater block 7 and is a thin elastic collar of a rubber type material. Towards tank 4 this collar seals against the wall of the inlet. Towards the cavity of the heater the end of the collar can move slightly sideways and this end of the collar represents the seat for the check ball. As one of the design objectives of this apparatus is compactness, the check ball is usually close to the source of steam bubbles that form within the heater cavity. Because of this closeness check ball 6 is susceptible to vibrations and consequently temporary leakages would occur if the seat for check ball 6 was inelastic, which in turn would hinder the transport of liquid from tank 4 to showerhead 9. Preferred heating elements 7b are power transistors forming part of a typical current source circuitry, as outlined in schematic FIG. 6. Predominantly heat is generated in power transistors 7b and current sensing resistors 7g. The control voltage Uc in conjunction with the value of resistor 7g determines the amount of current I. Under static conditions the electrical power input is equivalent to the product of supply voltage Us and current I. At a supply voltage of 12 Volt and a current of 20 Amp a total of 240 Watt of heating power is available. In a typical preferred embodiment one pair of power darlington transistors with an associated pair of current sensing resistors is mounted thermally conductive onto heater body 7. First pipe 8 is connected to the exit of heater body 7.

Figure 7:
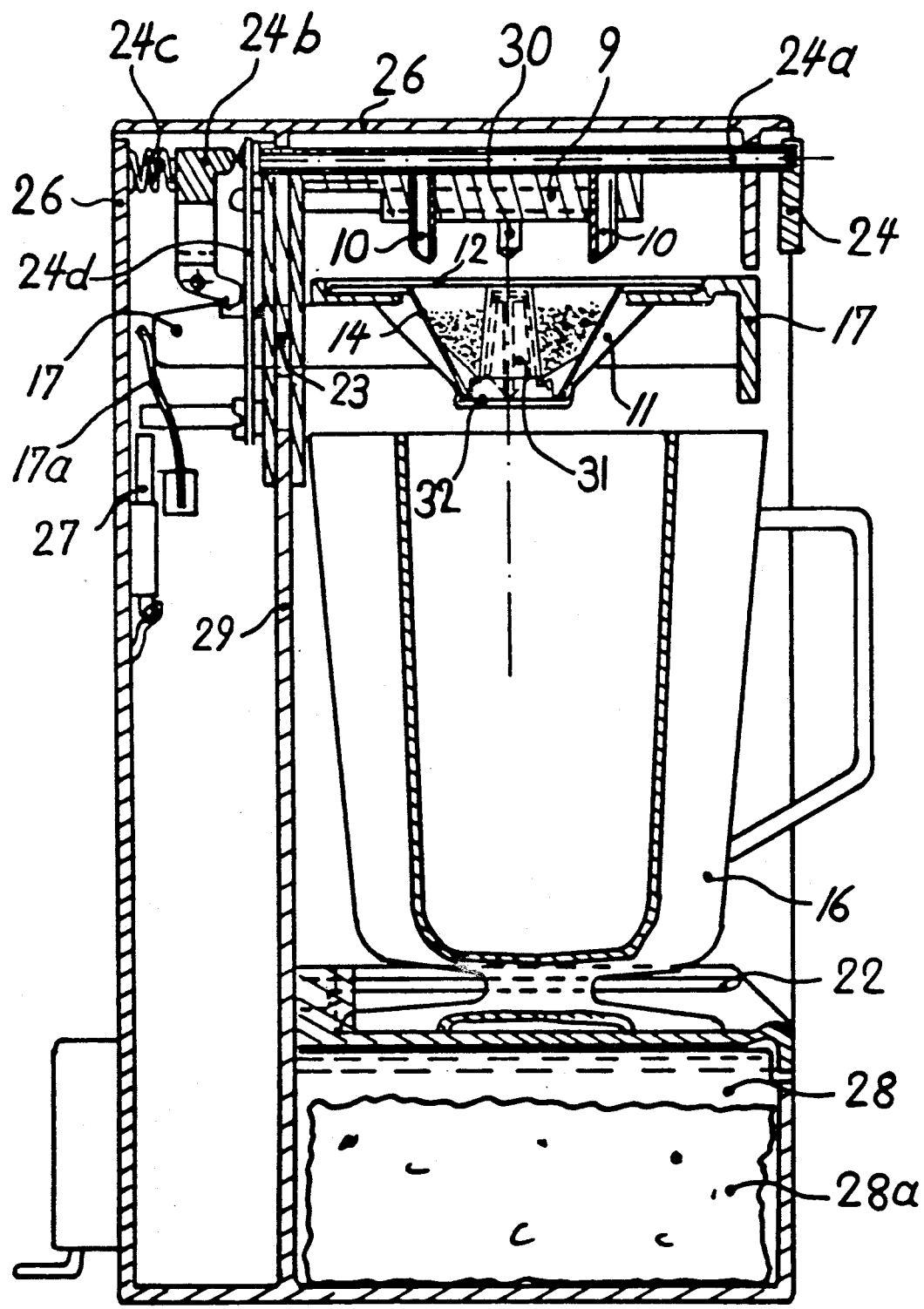
FIG. 7 shows cross section X—X of the chassis module with a cup placed onto its respective support.
Figure 9:
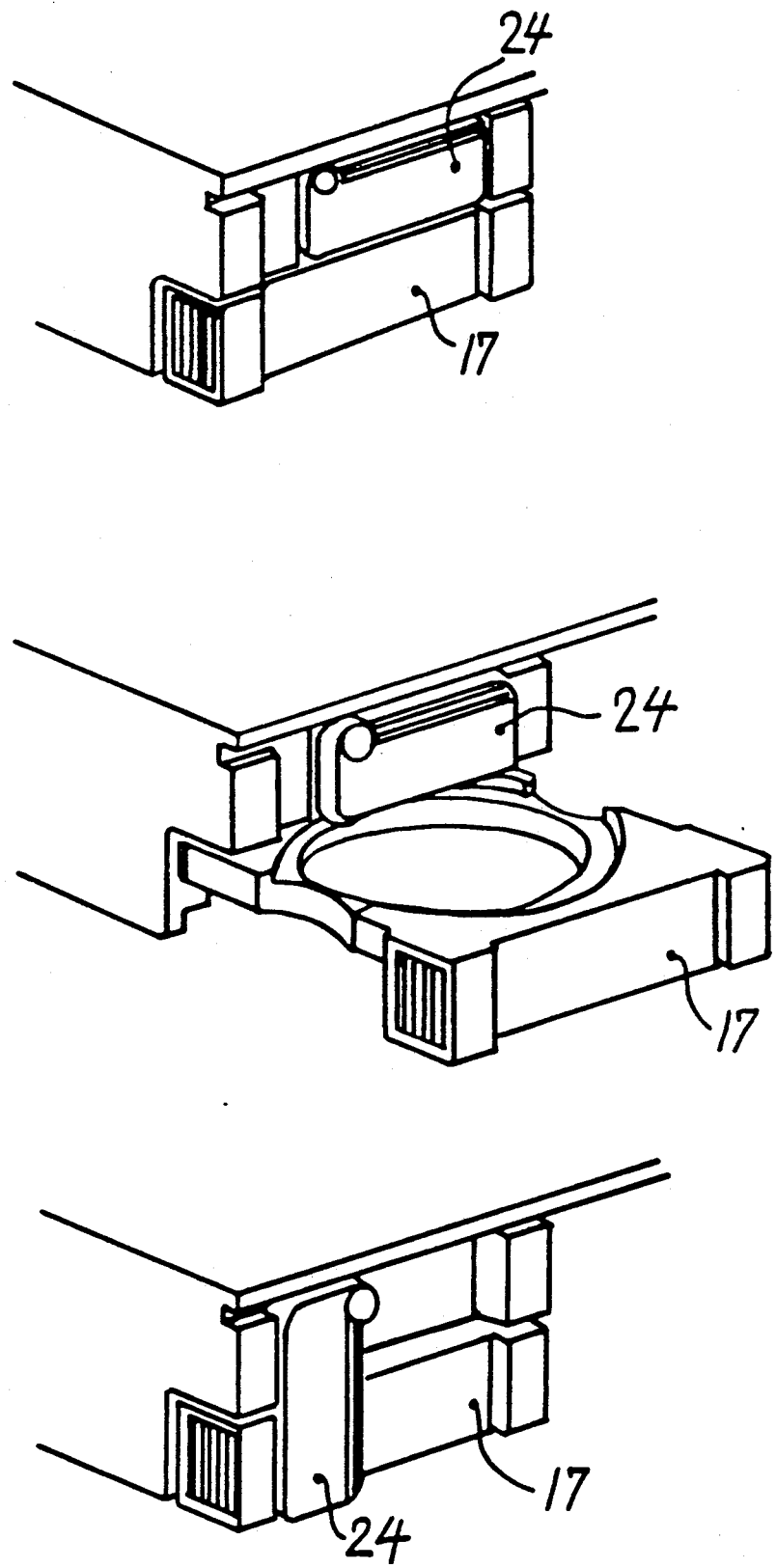
FIG. 9 illustrates particulars of the support for the filter unit in conjunction with the control lever and FIG. 10 illustrates particulars of the cup support.

FIG. 7 shows a cross section Y—Y of the chassis module. Control lever 24 is designed to execute a rotational movement as well as a movement in axial direction. In FIG. 3. FIG. 7 and in FIG. 8 control lever 24 is shown in its standby or neutral position. Without manual intervention the neutral position in axial direction is maintained by spring 24c exercising axial force between rear wall of chassis 26 via trigger lever 24b onto shaft 24a (FIG. 7), and the neutral position with respect to its rotation is maintained by spring 24f (FIG. 8) exercising force upwards onto lever 27a which is fixed onto guide 23 and has a linkage to connecting rod 24d, transmitting the force to crank 24e which crankshaft is axle 24a (FIG. 7) which is fixed to lever 24. FIG. 9 illustrates the functions of control lever 24. Pushing in axial direction onto the control lever 24 (FIG. 9 top) actuates trigger lever 24b (FIG. 7) and releases spring loaded (leaf spring 17a) support 17 for filter unit 11 to come forward out of the chassis 26 (FIG. 9 middle) in order for the operator to insert or remove a filter unit 11. Turning lever 24 by 90 degrees clockwise from its neutral position (FIG. 9 bottom) starts the brewing process by rotating crankshaft 24e (seen as rotating counter clockwise in FIG. 8) and consequently pushing connecting rod 24d downward which moves shower head 9, itself aligned by guide 23, downward (illustrated as being drawn with interrupted lines) towards the filter unit 11, closing value 3 via crankshaft 24e and connecting rod arrangement 3ff coupled to 3f, and switching on heater 7 via lever 27a and switch 27 (FIG. 7). FIG. 8 illustrates that immediately after hot water connector 8e the second part of first pipe 8 is formed by flexible tubing 8a, which, as indicated in FIG. 2, serves to accommodate for the vertical movement of head 9. In FIG. 8 tubing 8a is drawn interrupted to facilitate the view onto the separable mechanical connection between connecting rod 3f as part of the tank module and connecting rod 3ff as part of the chassis module. A specific advantage is that when lever 24 is turned to the "ON" position (FIG. 9 bottom) lever 24 prevents support 17 from getting inadvertently and prematurely released. The brewing is complete when volumetric measurement tank 4 has been emptied, which is characterized by the temperature in the heater 7 rising above the boiling temperature of the brewing liquid. Indicator lamp 7d (FIG. 4) is intended to signal this condition to the operator.

Figure 10:
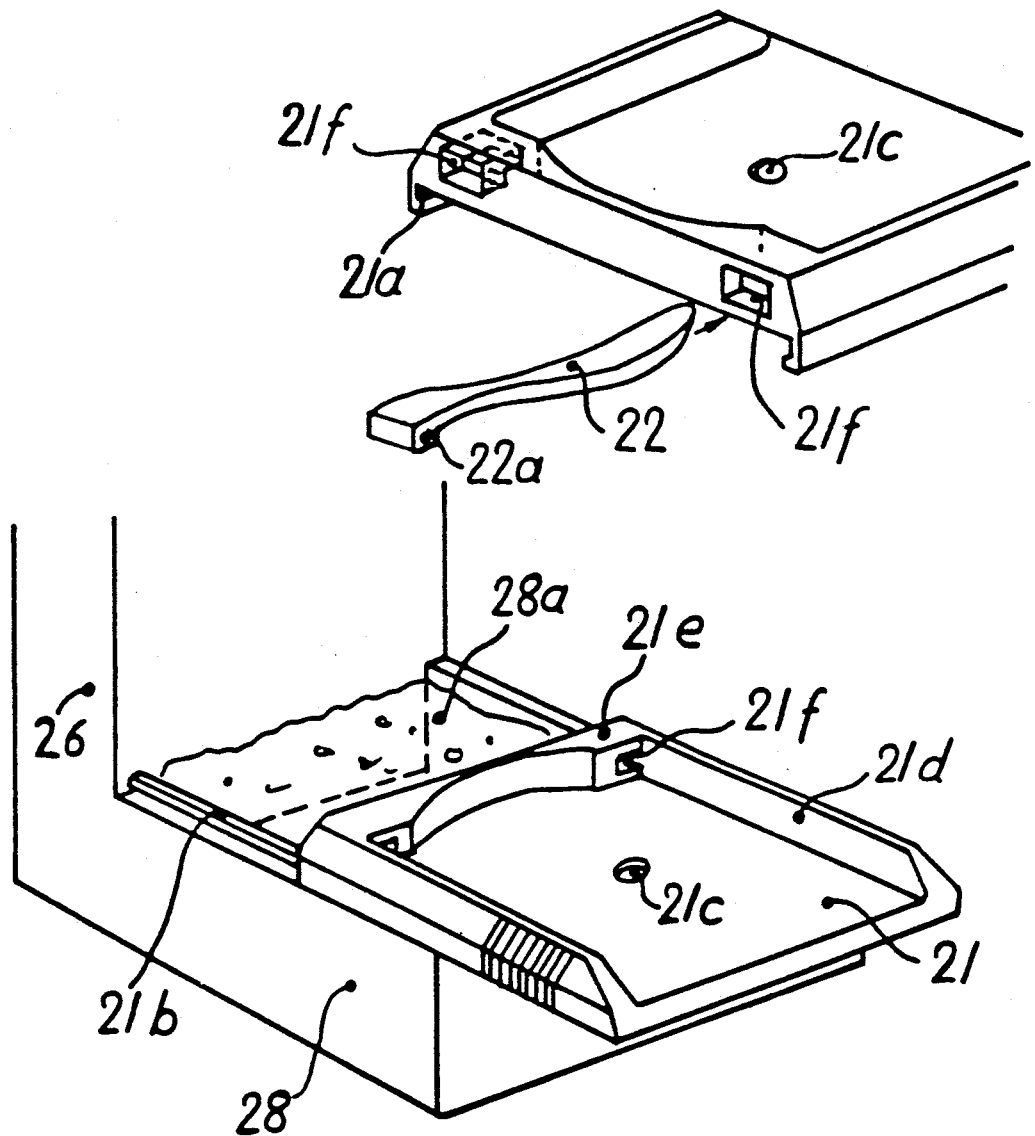

Particulars of the cup support are shown in FIG. 10. Lid 21 is equipped with borders 21d and end stop 21e to align the cup underneath filter unit 11. Tongues 22 fit into corresponding holes 21f in the end stop 21e of lid 21 and are removable from lid 21. This allows the use of differently shaped cups which are not equipped with the characteristic foot of the aforementioned commuter cup. Tongues 22 are equipped with a protrusion 22a perpendicular to their longitudinal axis at their rear end which fits into indentations 21f in end stop 21e, thus preventing tongues 22 from coming forward beyond their working position. Lid 21 is fitted onto chamber 28 of the chassis 26 by corresponding rails 21a and 21b, allowing lid 21 to slide forward from its rest position (rest position shown in FIG. 3.). Chamber 28 may be filled with a liquid absorbent material 28a like a sponge and in case any liquid drips from the head or filter unit without a cup being present, this liquid gets trapped in chamber 28 by passing through at least one opening 21c in lid 21.

In FIG. 7 shower head 9 is shown equipped with a fixed pushpin 30 which interacts with moveable pushpin 31 located in the main passage of the filter unit 11, whereby filter unit 11 is equipped also with a lower closure 32. Prior to processing of the filter unit in the apparatus the upper closure 12 and the lower closure 32 and filter carrier 14 together hermetically enclose the flavour substance and effectively shelter the flavour substance from the outer atmosphere. When brewing is initiated shower head 9 is brought in contact with filter unit 11 so that hot water outlets 10 pierce the upper closure. Simultaneously fixed pushpin 30 penetrates upper closure 12 and presses moveable pushpin 31, which extends between the upper closure 12 and the lower closure 32, downward the same distance that fixed pushpin 30 penetrates into the main passage of filter unit 11, which in turn tears lower closure 32 and thus opens the way for the brew to exit from the bottom of the filter unit. The preservation of the aroma of the flavour substance in an individual filter unit 11 is therefore achieved during the time span when the filter unit is manufactured until it is actually processed in the apparatus, without packing the filter unit in an additional protective pouch.

It should be noted that the internal venting system for tank 4 in the apparatus effectively guarantees consistent volumetric portioning of the brewing liquid regardless of accelerations or tilting of the apparatus within inclination angles normally experienced by land vehicles and sea vessels and that any liquid within the venting pipe arrangement is discharged within the tanks, thus preventing external spillage.

Operating the apparatus is very simple through centralizing all control functions in one lever.

Handling mistakes are virtually eliminated, because if the control lever is in its ON-position the support for the filter unit is mechanically blocked and so is the entire tank module blocked from removal, because connecting rod 3f is now extended beyond the border line of the tank module 25 and wall 29 restricts any movement of connecting rod 3f towards the front of the apparatus.

The lid 2 covering the filling opening is forced into its closed position when the tank module is inserted into the chassis and one cannot forget to have this potential source of spillage taken care of.

The electrical circuitry becomes operational only when the tank module is fully inserted into the chassis and simultaneously the connection for the hot water has been established, thus preventing spillage that might occur if the heater was operational but the hot water connection was not yet established.

Both the filling opening and the hot water connection of the tank module are located well above the highest liquid level in the storage tank. No valve is necessary to prevent the tanks from getting drained by hydrostatic pressure. This is unlike common household coffee makers with detachable water reservoir and possible predominantly because the heater as presented in this disclosure is integrated into the tank module.

Chamber 28 and opening 21c in the cup support provide safeguarding against an overflow condition that might occur if the brewing was started with a cup that was not empty.

I claim:

1. An electrical apparatus useful to prepare a hot beverage from a flavour substance comprising:
    a single serve filter unit comprising a filter carrier with a filter and flavour substance and an upper closure for the filter carrier;
    a storage container for liquid with a volume of at least one cup of finished brew;
    a volumetric measurement tank with a volume of one cup of finished brew to receive liquid from the storage container;
    a shut-off valve between the storage container and the volumetric measurement tank;
    venting pipes joining the top of the volumetric measurement tank with the top of the storage container;
    a heater for the liquid;
    a shower head to align with the filter unit and a cup;
    means to align the shower head with the filter unit and cup including a guide for the shower head, a support for the filter unit movable outwardly of the apparatus, the aligned position of the shower head with the filter unit and the cup being defined by the support for the filter unit being retracted into the apparatus and locked in position by a latch mechanism which can be released manually;
    a support for the cup whereby the guide for the shower head allows movement of the shower head perpendicular to the surface of the upper closure of the filter unit yet prevents movement of the shower head in a direction within the plane of the upper closure of the filter unit;
    a first pipe communicating the shower head with the heater; and
    means which, prior to the brewing, allow the liquid to pass from the storage tank into the volumetric measurement tank yet prevent liquid from passing from the volumetric measurement tank to the shower head, and which during brewing prevent liquid to pass from the storage tank into the volumetric measurement tank yet allow liquid to pass from the volumetric measurement tank through the first pipe through the Shower Head into the filter unit.

2. Apparatus according to claim 1 whereby the support for the cup is formed by a chamber at the bottom of the apparatus lined up with the centre line extending from the shower head through the filter unit and through the cup whereby the chamber is closed on top with a removable lid onto which the cup is to be placed.

3. Apparatus as claimed in claim 2 whereby the lid of the chamber forming the cup support is equipped with means to guide a cup into position and to prevent the cup from moving without manual intervention.

4. Apparatus according to claim 3 in which the means to guide the cup and prevent its unintentional movement include raised border lines around the top edge of the lid and a tongue on the left and right inside of the lid's borders whereby the tongues protrude from the back and are adapted to clamp down on the horizontally extended foot of a cup.

5. Apparatus as claimed in claim 1 whereby the apparatus is segmented in a tank module and a chassis module whereby the tank module comprises:
the storage tank;
the volumetric measurement tank;
the venting pipes;
the shut-off valve;
the heater;
a first part of a first pipe;
and the chassis module comprises:
the second part of the first pipe; the shower head;
the means to align the shower head with the filter unit and the cup;
and the means to control the flow of liquid between the storage tank, the volumetric measurement tank and the shower head and whereby the tank module can be connected with the chassis module in a separable fashion.

6. Apparatus as claimed in claim 9 in which the first part of the first pipe is guided to the top of the tank module above the highest liquid level stored in the tank module where the first part of the first pipe ends in a connector suitable to connect with a counterpart connector attached to the chassis module in order to form a watertight connection when tank module and chassis module are connected to each other.

7. Apparatus according to claim 6 in which the first part of the first pipe is routed within a protective tube leaving airspace between the inner wall of the protective tube and the outer wall of the first pipe and whereby the protective tube is routed through the volumetric measurement tank and the storage tank.

8. Apparatus according to claim 5 in which the tank module is equipped with a carrying handle extending outward from the front of the tank module.

9. Apparatus according to claim 5 in which the tank module is equipped on the top surface with a hinged lid which when closed covers the filling opening into the storage tank and whereby the axis of the hinge is oriented parallel to the plain of the top of the tank module and the axis is located in the section between the filling opening and the rear of the tank module.

10. Apparatus according to claim 9 with a tongue attached to the hinged lid and said tongue pointing from the lid towards the front and top of the apparatus and the tongue protruding beyond the front edge of the tank module whereby the tongue is equipped with means to interlock with corresponding means attached to the top of the chassis module providing a latch mechanism for the tank module when it is fully inserted into the chassis module and preventing the tank module from retracting without manual intervention.

11. A electrical apparatus useful to prepare a hot beverage from a flavour substance comprising:
a single serve filter unit comprising a filter carrier with a filter and flavour substance and an upper closure for the filter carrier;
a storage container for a liquid with a volume of at least one cup of finished brew;
a volumetric measurement tank with a volume of one cup of finished brew to receive liquid from the storage container;
a shut-off valve between the storage container and the volumetric measurement tank;
venting pipes joining the top of the volumetric measurement tank with the top of the storage container;
a heater for the liquid;
a shower head to align with the filter unit and the cup;
a first pipe communicating the shower head with the heater;
flow control means which, prior to brewing, allow the liquid to pass from the storage tank into the volumetric measurement tank yet prevent liquid from passing from the volumetric measurement tank to the shower head, and which, during brewing, prevent liquid passing from the storage tank into the volumetric measurement tank yet allow liquid to pass from the volumetric measurement tank through the first pipe through the shower head into the filter unit;
said control means including a control lever and a switch for the heater and a linkage to the shower head, whereby movement of the control lever actuates the shut-off valve and simultaneously moves the shower head and actuates the switch for the heater so that in an off position of the control lever, the shut-off valve is open and the heater is switched off and the shower head is disengaged from the filter unit and in an on position of the control lever the shut-off valve is closed, the heater is switched on and the shower head is engaged with the filter unit.

12. Apparatus according to claim 11 in which the control lever is attached perpendicularly to a shaft and whereby rotational motion of the shaft; controls the flow of liquid by actuating the shut-off valve and an electrical switch for the heater and moves the shower head;
and axial motion of the shaft; controls the release of the support of the filter unit from it's aligned position.

13. A electrical apparatus useful to prepare a hot beverage from a flavour substance comprising:
a single serve filter unit comprising a filter carrier with filter and flavour substance and an upper closure for the filter carrier;
a storage container for a liquid with a volume of at least one cup of finished brew;
a volumetric measurement tank with a volume of one cup of finished brew to receive liquid from the storage container;
a shut-off valve between the storage container and the volumetric measurement tank;
venting pipes joining the top of the volumetric measurement tank with the top of the storage tank;
a heater for the liquid, said heater comprising a heat exchanger block of a good thermal conductor with channels routed inside the block for the liquid, one inlet into the channels and one outlet from the channels, power semi-conductors mounted in a thermally conductive manner onto the block, electrical control circuitry that controls the electrical power consumption of said power semi-conductors and a temperature sensor mounted onto the heat exchanger block and electrically connected to the control circuitry;
a shower head to align with the filter unit and a cup;
a first pipe communicating the shower head with the heater; and flow control means which, prior to brewing, allow the liquid to pass from the storage tank into the volumetric measurement tank yet prevent liquid from passing from the volumetric measurement tank to the shower head, and which during brewing prevent liquid passing from the storage tank into the volumetric measurement tank yet allow liquid to pass from the volumetric measurement tank through the first pipe through the shower head into the filter unit.

14. Apparatus as claimed in claim 13 in which the inlet into the heat exchanger block is equipped with a check valve including a checkball of a material that has a specific gravity less than that of the liquid from which the brew is to be made.

15. Apparatus as claimed in claim 13 in which the inlet into the heat exchanger block is equipped with a check valve including a check ball and a seat for the checkball formed by a thin walled elastic and circular collar extending in the direction of the flow of the liquid whereby the upper rim of the collar faces towards the inlet opening and is sealing against the inlet wall and the lower rim of the collar being free, facing towards the inside of the heat exchanger block and providing the actual seat for the checkball.

16. An electrical apparatus useful to prepare a hot beverage from a flavour substance comprising:

a single serve filter unit comprising a filter carrier with a filter and a main passage extended through the filter carrier and open at both ends of the carrier and a channel defined between the base of the filter and the main passage, a second passage joining the interior of the main passage to the channel, an upper closure for the filter carrier and a lower closure for the filter carrier, a movable push pin extending within the main passage from the upper closure to the lower closure of the filter unit;

a flavour substance within the filter unit;

a storage container for a liquid with a volume of at least one cup of finished brew;

a volumetric measurement tank with a volume of one cup of finished brew to receive liquid from the storage containers;

a shut-off valve between the storage container and the volumetric measurement tank;

venting pipes joining the top of the volumetric measurement tank with the top of the storage tank;

a heater for the liquids;

a shower head to align with the filter unit and the cup;

the shower head being equipped with a push pin such that under operating conditions the centre lines of the push pin attached to the head and the push pin of the filter unit are substantially aligned;

a first pipe communicating the shower head with the heater; and flow control means which, prior to brewing, allow the liquid to pass from the storage tank into the volumetric measurement tank yet prevent liquid from passing from the volumetric measurement tank to the shower head, and which during brewing prevents liquid passing from the storage tank into the volumetric measurement tank yet allow liquid to pass from the volumetric measurement tank through the first pipe through the shower head into the filter unit.

* * * * *